(12) United States Patent
Onal

(10) Patent No.: US 9,957,598 B2
(45) Date of Patent: May 1, 2018

(54) COATED ARTICLES AND COATING METHODS

(71) Applicant: GENERAL ELECTRIC COMPANY, Schenectady, NY (US)

(72) Inventor: Kivilcim Onal, Greer, SC (US)

(73) Assignee: General Electric Company, Schenectady, NY (US)

( * ) Notice: Subject to any disclaimer, the term of this patent is extended or adjusted under 35 U.S.C. 154(b) by 55 days.

(21) Appl. No.: 15/056,401

(22) Filed: Feb. 29, 2016

(65) Prior Publication Data

US 2017/0247784 A1   Aug. 31, 2017

(51) Int. Cl.
*B32B 7/00* (2006.01)
*C23C 4/073* (2016.01)
*B32B 15/04* (2006.01)

(52) U.S. Cl.
CPC .............. *C23C 4/073* (2016.01); *B32B 15/04* (2013.01); *Y10T 428/12451* (2015.01); *Y10T 428/12493* (2015.01)

(58) Field of Classification Search
None
See application file for complete search history.

(56) References Cited

U.S. PATENT DOCUMENTS

| | | | | |
|---|---|---|---|---|
| 4,676,994 A * | 6/1987 | Demaray | ............... | C23C 14/025 427/248.1 |
| 5,316,866 A * | 5/1994 | Goldman | ................ | B32B 15/01 148/410 |
| 6,096,381 A * | 8/2000 | Zheng | ........................ | C23C 4/02 427/454 |
| 6,447,932 B1 | 9/2002 | O'Hara et al. | | |
| 7,294,413 B2 | 11/2007 | Nagaraj et al. | | |
| 7,413,778 B2 | 8/2008 | Gorman et al. | | |
| 2002/0090464 A1* | 7/2002 | Jiang | ......................... | C23C 4/00 427/446 |
| 2005/0003227 A1* | 1/2005 | Khan | ..................... | C23C 28/321 428/632 |
| 2005/0123783 A1 | 6/2005 | Gregory et al. | | |
| 2005/0260434 A1* | 11/2005 | Nelson | ....................... | C23C 4/18 428/632 |
| 2011/0171488 A1* | 7/2011 | Taylor | ..................... | C23C 28/00 428/623 |
| 2013/0202990 A1* | 8/2013 | Jindal | ...................... | C23C 14/34 430/5 |
| 2014/0065408 A1* | 3/2014 | Strock | ........................ | C23C 4/11 428/316.6 |
| 2015/0030826 A1 | 1/2015 | Kamel et al. | | |

* cited by examiner

*Primary Examiner* — Seth Dumbris
(74) *Attorney, Agent, or Firm* — McNees Wallace & Nurick LLC

(57) ABSTRACT

A coated article is disclosed including a substrate, a bond coating, and a thermally insulating top coating. The substrate includes a substrate surface and a substrate material at the substrate surface. The bond coating is disposed on and contacts the substrate surface, and includes the substrate material and a bond coating surface distal from the substrate surface. The bond coating surface includes a greater surface roughness than the substrate surface. The thermally insulating top coating is disposed on and contacts the bond coating surface. A method for forming the coated article includes applying the bond coating to the substrate surface, and applying the thermally insulating top coating to the bond coating surface.

16 Claims, 1 Drawing Sheet

COATED ARTICLES AND COATING METHODS

FIELD OF THE INVENTION

The present invention is directed to coated articles and coating methods. More particularly, the present invention is directed to coated articles and coating methods including bond coatings formed from the same materials as the substrates.

BACKGROUND OF THE INVENTION

Gas turbines for power generation systems must satisfy the highest demands with respect to reliability, power, efficiency, economy, and operating service life. Modern high-efficiency combustion turbines have firing temperatures that exceed about 2,300° F. (1,260° C.), and firing temperatures continue to increase as demand for more efficient engines continues. Many components that form the combustor and "hot gas path" turbine sections are directly exposed to aggressive hot combustion gases. The use of coatings on turbine components such as combustors, combustion liners, combustion transition pieces, combustion hardware, blades (buckets), vanes (nozzles) and shrouds is important in commercial gas turbine engines.

Coatings, such thermal barrier coating systems, contribute to desirable performance characteristics and operating capabilities at elevated temperatures. Typical thermal barrier coating systems include a bond coating disposed on the substrate of the turbine component, and a thermally insulating top coating disposed on the bond coating. The bond coating can be a diffusion type of coating or an MCrAlY type of coating, where M is nickel, cobalt, iron, or a combination thereof. The bond coating provides oxidation and hot corrosion protection to the underlying substrate of the turbine component, which are typically made of nickel-based, cobalt-based, or iron-based superalloys. Bond coatings also provide an interface for the ceramic top coat to adhere. However, while bond coatings improve adherence of the thermally insulating top coating, bond coatings are themselves often weaker than the underlying substrate due to their chemical compositions and phase constituents, which are different than the composition of the substrate, and may also be different than the phase constituents of the substrate. The chemical mismatch between the substrate and the bond coating creates a diffusion couple, and results in the formation of an interdiffusion zone with properties that are different than the bond coating and the substrate, and also creates a differential in the coefficient of thermal expansion across the substrate-interdiffusion zone-bond coating. It furthermore results in the formation of new, sometimes detrimental phases, which may cause embrittlement at the substrate/bond coating interface. Among other factors, the quality of the bond coating/substrate interface and the coefficient of thermal expansion transition in the thermal barrier coating system has an impact on the overall life capability of the thermal barrier coating system, and may lead to early spallation of the thermally insulating top coating.

BRIEF DESCRIPTION OF THE INVENTION

In an exemplary embodiment, a coated article includes a substrate, a bond coating, and a thermally insulating top coating. The substrate includes a substrate surface and a substrate material at the substrate surface. The bond coating is disposed on and contacts the substrate surface. The bond coating includes the substrate material and a bond coating surface distal from the substrate surface, and the bond coating surface includes a greater surface roughness than the substrate surface. The thermally insulating top coating is disposed on and contacts the bond coating surface.

In another exemplary embodiment, a method for forming a coated article includes applying a bond coating to a substrate surface of a substrate. The substrate includes a substrate material at the substrate surface, and the bond coating contacts the substrate surface. A bond coating surface is formed distal from the substrate surface. The bond coating surface includes a greater surface roughness than the substrate surface. A thermally insulating top coating is applied to the bond coating surface, and the thermally insulating top coating contacts the bond coating surface.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary coated articles and coating methods. Embodiments of the present disclosure, in comparison to methods not utilizing one or more features disclosed herein, improve coating durability, increase thermal fatigue resistance, reduce thermal expansion induced spallation, eliminate chemical gradient induced mismatch between the substrate and bond coating, reduce aluminum loss into the substrate, eliminate formation of additional phases that are not naturally present or are not expected to form in the substrate alloy and which may be detrimental to the thermal barrier coating system, such as topologically closed packed phases, eliminate the need for additional intermediate bond coatings, increase spallation life, reduce process complexity, increase process efficiency, reduce heat treatment complexity, decrease costs, or a combination thereof.

Figure 1:
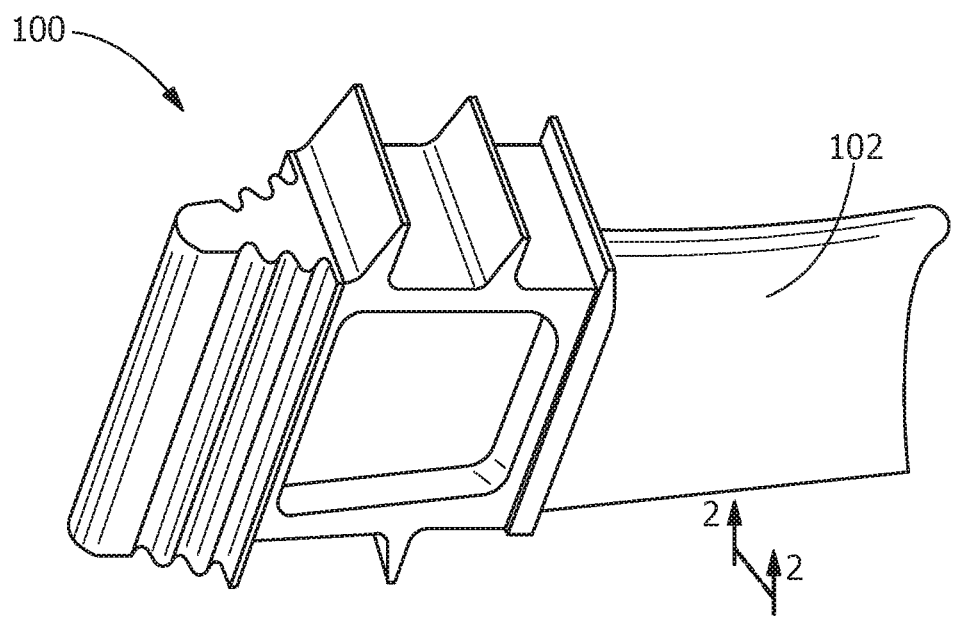
FIG. 1 is a perspective view of a coated article, according to an embodiment of the disclosure.

Referring to FIG. 1, in one embodiment, a coated article 100 is depicted. The coated article 100 may be any suitable component, including, but not limited to, a turbine component 102. Suitable turbine components may include, but are not limited to, a combustor, a combustion liner, a combustion transition piece, a combustion venturi, a combustion cap, a combustion fuel nozzle, combustion hardware, a blade (bucket) (shown), a vane (nozzle) a shroud, or a combination thereof.

Figure 2:
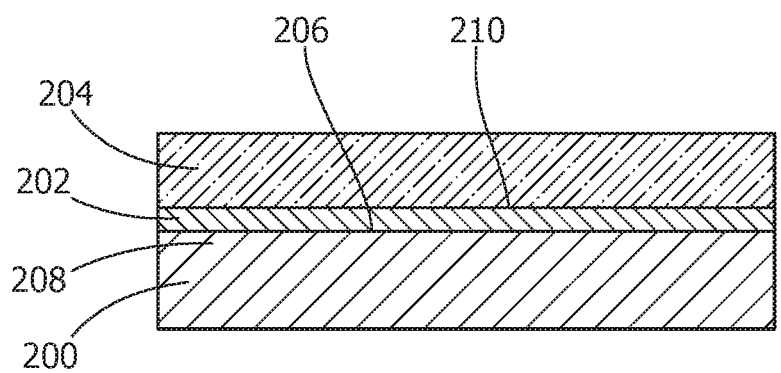
FIG. 2 is a sectional view along lines 2-2 of FIG. 1 of the coated article, according to an embodiment of the disclosure.

Referring to FIG. 2, in one embodiment, the coated article 100 includes a substrate 200, a bond coating 202, and a thermally insulating top coating 204. The substrate 200 includes a substrate surface 206 and a substrate material 208 at the substrate surface 206. The bond coating 202 is disposed on and contacts the substrate surface 206. The bond coating 202 includes the substrate material 208 and a bond coating surface 210 distal from the substrate surface 206. The thermally insulating top coating 204 is disposed on and contacts the bond coating surface 210. In another embodiment, the bond coating 202 consists essentially of the substrate material 208, in addition to any surface oxidation or incidental impurities which may be present.

As used herein, "contacts" indicates direct contact without intervening layers, coatings or materials, other than incidental impurities or surface oxidation. "Incidental impurities" refers to the presence of de minimus foreign materials which do not materially impact the properties of the coated article.

The bond coating surface 210 includes a greater surface roughness than the substrate surface 206. In one embodiment, the surface roughness of the bond coating surface 210 is at least 100 $R_a$, alternatively at least 150 $R_a$, alternatively at least 175 $R_a$, alternatively between about 100 $R_a$ and about 1,000 $R_a$, alternatively between about 150 $R_a$ and about 800 $R_a$, alternatively between about 175 $R_a$ and about 700 $R_a$.

The substrate material 208 may be any suitable material. In one embodiment, the substrate material 208 is a superalloy such as, but not limited to, a nickel-based superalloy, a cobalt-based superalloy, an iron-based superalloy, or a combination thereof. Suitable superalloys may include, but are not limited to, FSX 414, GTD 111, GTD 141, GTD 222, GTD 444, INCONEL 718, INCONEL 738, René 108, René N2, René N4, René N5, and René N500.

As used herein, "FSX 414" refers to an alloy including a composition, by weight, of about 10% nickel, about 29% chromium, about 7% tungsten, up to about 2% iron, up to about 1% silicon, up to about 1% manganese, about 0.25% carbon, and a balance of cobalt.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel.

As used herein, "GTD 141" refers to an alloy including a composition, by weight, of about 13.8% chromium, about 9.4% cobalt, about 3.8% tungsten, about 4.8% titanium, about 2.8% aluminum, about 1.4% niobium, about 1.5% molybdenum, and a balance of nickel.

As used herein, "GTD 222" refers to an alloy including a composition, by weight, of about 23.5% chromium, about 19% cobalt, about 2% tungsten, about 0.8% niobium, about 2.3% titanium, about 1.2% aluminum, about 1% tantalum, about 0.25% silicon, about 0.1% manganese, and a balance of nickel.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel.

As used herein, "INCONEL 718" refers to an alloy including a composition, by weight, of about 52.5% nickel, about 19% chromium, about 3% molybdenum, about 5.1% niobium, about 1% cobalt, about 0.35% manganese, about 0.5% copper, about 0.9% aluminum, about 0.3% titanium, about 3.5% silicon, and a balance of iron.

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel.

As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel.

As used herein, "René N2" refers to an alloy including a composition, by weight, of about 7.5% cobalt, about 13% chromium, about 6.6% aluminum, about 5% tantalum, about 3.8% tungsten, about 1.6% rhenium, about 0.15% hafnium, and a balance of nickel.

As used herein, "René N4" refers to an alloy including a composition, by weight, of about 9.75% chromium, about 7.5% cobalt, about 4.2% aluminum, about 3.5% titanium, about L5% molybdenum, about 6.0% tungsten, about 4.8% tantalum, about 0.5% niobium, about 0.15% hafnium, and a balance of nickel.

As used herein, "René N5" refers to an alloy including a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, and a balance of nickel.

As used herein, "René N500" refers to an alloy including a composition, by weight, of about 7.5% cobalt, about 0.2% iron, about 6% chromium, about 6.25% aluminum, about 6.5% tantalum, about 6.25% tungsten, about 1.5% molybdenum, about 0.15% hafnium, and a balance of nickel.

In another embodiment, the substrate material 208 is a titanium alloy, an aluminum alloy, an aluminum-titanium-based alloy, a steel, a stainless steel, or a combination thereof.

In one embodiment, the bond coating 202 includes at least one of a γ-phase and a γ'-phase. In a further embodiment, the bond coating 202 includes a γ-phase and a γ'-phase. In another embodiment, the bond coating 202 includes a γ-phase and a β-phase.

In one embodiment, the bond coating 202 includes a porosity of 0% to about 60%, alternatively about 0.1% to about 60%, alternatively about 1% to about 60%, alternatively about 5% to about 60%. In another embodiment, the bond coating 202 includes a gradient of porosity increasing from adjacent to the substrate surface 206 to the bond coating surface 210.

The thermally insulating top coating 204 may be any suitable material, including, but not limited to, a ceramic such as a rare-earth doped ceramic oxide. Suitable rare-earth doped ceramic oxides may include, but are not limited to, yttria stabilized zirconia, calcia stabilized zirconia, ceria stabilized zirconia, scandia stabilized zirconia, magnesia stabilized zirconia, india stabilized zirconia, lanthana stabilized zirconia, neodymia stabilized zirconia, ytterbia stabilized zirconia, strontia stabilized zirconia, barium oxide stabilized zirconia, nickel oxide stabilized zirconia, ferric oxide stabilized zirconia, cobaltous oxide stabilized zirconia, dysprosia stabilized zirconia, gadolinia stabilized zirconia, samaria stabilized zirconia, erbia stabilized zirconia, europia stabilized zirconia, praseodyrnia stabilized zirconia, and mixtures thereof.

In one embodiment, the thermally insulating top coating 204 is a dense vertically-cracked ceramic coating, a porous ceramic coating, a Super-B ceramic coating, a slurry type ceramic coating, or a combination thereof.

In one embodiment, a method for forming the coated article 100 includes applying the bond coating 202 to a substrate surface 206 of the substrate 200, and forming the bond coating surface 210 distal from the substrate surface 206. The thermally insulating top coating 204 is applied to the bond coating surface 210. In one embodiment, the method further includes sequentially heat treating the bond coating 202 and the thermally insulating top coating 204, by heat treating the bond coating 202 before applying the thermally insulating top coating 204, and then heat treating the thermally insulating top coating 204 after the thermally insulating top coating 204 is applied. In another embodiment, the method further includes simultaneously heat treating the bond coating 202 and the thermally insulating top coating 204.

Applying the bond coating 202 to the substrate surface 206 may include any suitable technique, including, but not limited to, air plasma spray, high velocity oxygen fuel thermal spray, high velocity air fuel spray, vacuum plasma spray, cold spray, or a combination thereof. Applying the thermally insulating top coating 204 to the bond coating surface 210 may include any suitable technique, including those techniques suitable for applying the bond coating 202 to the substrate surface 206.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A coated article, comprising:
   a substrate including a substrate surface and a substrate material at the substrate surface;
   a bond coating disposed on and contacting the substrate surface, the bond coating consisting of the substrate material and including a bond coating surface distal from the substrate surface, the bond coating surface including a greater surface roughness than the substrate surface; and
   a thermally insulating top coating disposed on and contacting the bond coating surface,
   wherein the substrate is a turbine component.

2. The coated article of claim 1, wherein the substrate material is a superalloy.

3. The coated article of claim 2, wherein the superalloy is selected from the group consisting of a nickel-based superalloy, a cobalt-based superalloy, an iron-based superalloy, and combinations thereof.

4. The coated article of claim 1, wherein the substrate material is selected from the group consisting of a titanium alloy, an aluminum alloy, an aluminum-titanium-based alloy, a steel, a stainless steel, and combinations thereof.

5. The coated article of claim 1, wherein the thermally insulating top coating is selected from the group consisting of a dense vertically-cracked ceramic coating, a porous ceramic coating, a Super-B ceramic coating, a slurry type coating, and combinations thereof.

6. The coated article of claim 1, wherein the bond coating includes at least one of a $\gamma$-phase and a $\gamma'$-phase.

7. The coated article of claim 1, wherein the bond coating includes a porosity of between 0% to about 60%.

8. The coated article of claim 1, wherein the bond coating includes a gradient of porosity increasing from adjacent to the substrate surface to the bond coating surface.

9. A method for forming a coated article, comprising:
   applying a bond coating to a substrate surface of a substrate, the substrate including a substrate material at the substrate surface, the bond coating consisting of the substrate material and contacting the substrate surface;
   forming a bond coating surface distal from the substrate surface, the bond coating surface including a greater surface roughness than the substrate surface; and
   applying a thermally insulating top coating to the bond coating surface, the thermally insulating top coating contacting the bond coating surface,
   wherein the substrate is a turbine component.

10. The method of claim 9, wherein applying the bond coating to the substrate surface includes applying the bond coating to a superalloy as the substrate material.

11. The method of claim 10, wherein applying the bond coating to the substrate surface includes applying the bond coating to a superalloy selected from the group consisting of a nickel-based superalloy, a cobalt-based superalloy, an iron-based superalloy, or a combination thereof.

12. The method of claim 9, wherein applying the bond coating to the substrate surface includes applying the bond coating to a material selected from the group consisting of a titanium alloy, an aluminum alloy, an aluminum-titanium-based alloy, a steel, a stainless steel, and combinations thereof, as the substrate material.

13. The method of claim 9, wherein applying the thermally insulating top coating includes applying a coating selected from the group consisting of a dense vertically-cracked ceramic coating, a porous ceramic coating, a Super-B ceramic coating, a slurry coating, and combinations thereof.

14. The method of claim 9, wherein applying the bond coating includes applying the bond coating having at least one of a $\gamma$-phase and a $\gamma'$-phase.

15. The method of claim 9, further including sequentially or simultaneously heat treating the bond coating and the thermally insulating top coating.

16. The method of claim 9, wherein applying the bond coating includes applying the bond coating by a technique selected from the group consisting of air plasma spray, high velocity oxygen fuel thermal spray, high velocity air fuel spray, vacuum plasma spray, cold spray, and combinations thereof.

* * * * *